United States Patent Office 3,119,744
Patented Jan. 28, 1964

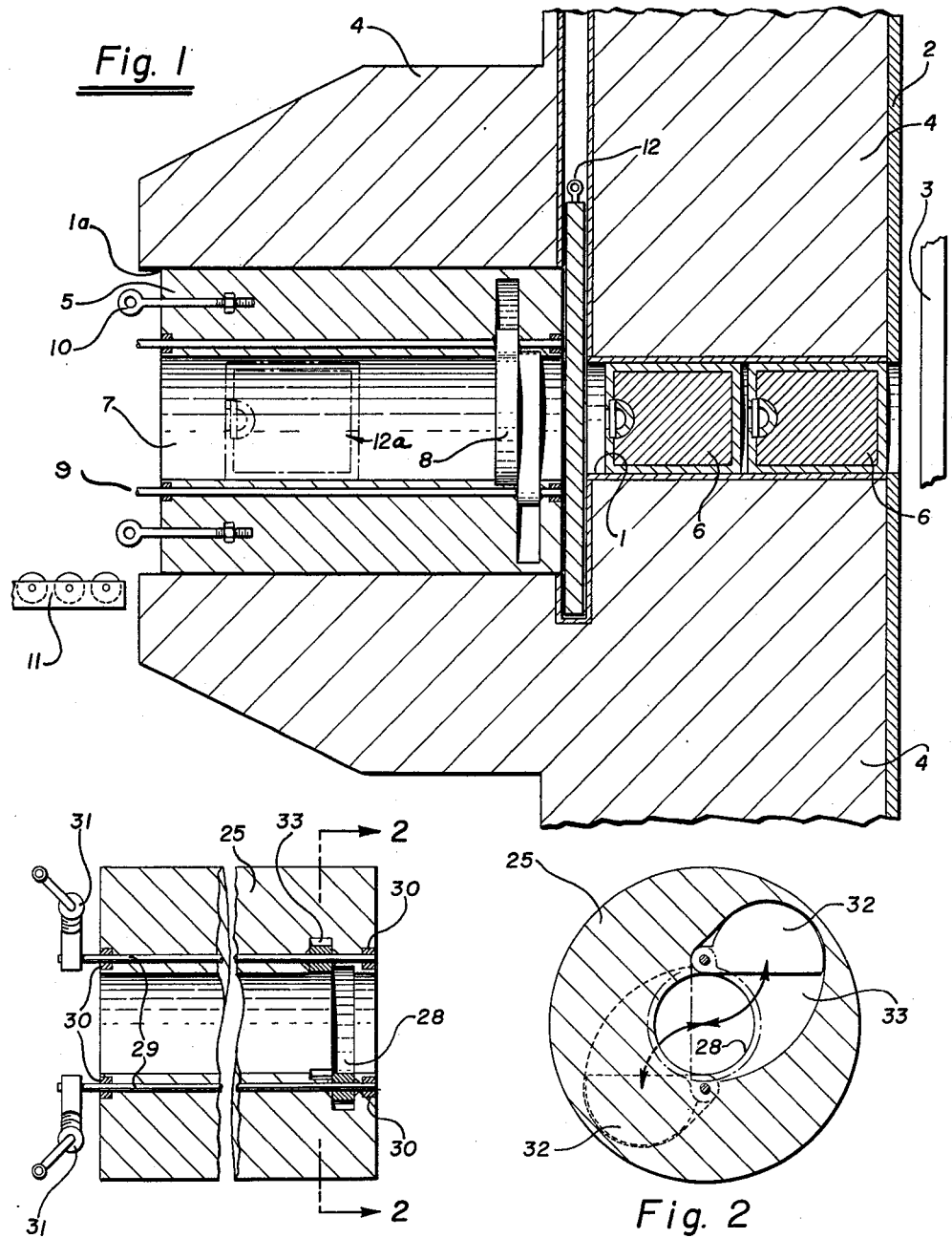

3,119,744
METHOD OF OPERATING A NUCLEAR
REACTOR
Stuart McLain, Downers Grove, Ill.
(2323 S. 9th St., Lafayette, Ind.)
Filed Nov. 30, 1959, Ser. No. 856,171
2 Claims. (Cl. 176—33)

My invention relates to improvements in nuclear or neutronic reactors. More specifically, my invention is a new and unusual method and apparatus for material and equipment handling in and adjacent to nuclear reactors as part of the process of subjecting materials, equipment, or instruments to nuclear irradiation for test or other purposes, so as to insure adequate safety to personnel and equipment.

In all existing nuclear reactors elaborate precautions must be taken when inserting or removing materials from the vicinity of the reactor core. This is especially true of reactors used for test purposes such as those covered by U.S. Patent No. 2,831,806 to Wigner and by U.S. Patent No. 2,857,324 to De Boisblanc et al. My invention, however, is not limited to reactors used for test purposes but may also be used in conjunction with power reactors where access to a highly radioactive area is required or in conjunction with production reactors.

For safety reasons, in order to prevent injury from nuclear radiation, nuclear reactors are constructed with large volumes of shielding material surrounding them, said shielding material being comprised of such materials as concrete, water, steel, lead, or a combination of these and other materials which absorb, reflect or attenuate various types and energies of nuclear radiation as is well known to those skilled in the art. When access to the vicinity of the reactor core is desired it must be had through holes in the shielding which are protected by large shielding plugs. Such plugs are described in U.S. Patent No. 2,716,705 to Zinn. These are generally made from the same type of material as the shielding wall itself and are usually quite heavy or bulky. Great care must be exercised in removing them from the reactor since the parts of such plugs close to the reactor core themselves become radioactive and hence are hazardous. For this reason such plugs are handled by the use of large containers or receptacles which are themselves made of shielding materials. These are generally referred to as "coffins" by those skilled in the art. (See Introduction to Nuclear Engineering, Richard Stephenson, McGraw-Hill Book Company, New York.) This type of coffin must obviously be quite heavy and even more bulky than the plug itself.

Many expensive and cumbersome expedients have been employed to provide safety features in connection with access to nuclear reactors. Thus the access openings are made of different and abruptly changing diameters along their length to prevent streaming of gammas and other forms of radiation out of the hole. Double doors and locks of various configurations have been used. Elaborate handling devices such as master-slave manipulators have been devised. Such devices often require the use of special visual aids such as a periscope or television apparatus to make complete remote handling from a distant point practicable. In some applications, the entire area around and above the access opening is flooded and a completely underwater method of handling is utilized. Access is also effected by means of a hydraulic conveyor tube or "rabbit" such as that disclosed in U.S. Patent No. 2,803,601 to Cooper.

I have discovered that most of the objections to the present methods and apparatus used in handling radiation shield plugs and other equipment and materials in and out of nuclear reactors may be overcome by the proper use of an unusual configuration and combination of coffin and plug.

It is therefore an object of my invention to provide a method and apparatus for the safe handling of materials and equipment in and out of nuclear reactors which would be more efficient than those now in use.

It is another object of my invention to provide a method and apparatus for the safe handling of materials and equipment in and out of nuclear reactors which would give greater ease of operation than those now in use.

It is a further object of my invention to eliminate the need for separate coffins in the safe handling of materials and equipment in and out of nuclear reactors.

It is a more specific object of my invention to provide a radiation shield plug for an access opening in a nuclear reactor which is comprised of a separate inner and a separate outer part in which the outer part is arranged and functions as a coffin for use in handling the inner part.

Other objects and advantages of my invention will become evident to those skilled in the art by reference to the description and drawings which follow:

FIGURE 1 is a longitudinal section through a typical beam or access hole of a test reactor showing all the principal features of a preferred embodiment of my invention.

FIGURE 2 is a diagrammatic end view of the coffin showing the principle of operation of one embodiment of the coffin doors.

FIGURE 2–A is a diagrammatic section view illustrating the same principle as FIGURE 2.

Referring now to the drawings and particularly to FIGURE 1, the reactor access hole comprising sections 1 and 1a is shown in its relative position to the reactor tank 2 and reactor core 3, all of which are surrounded by the concrete shielding 4.

The part of the access hole 1 which is adjacent to the reactor tank 2 is preferably made slightly less than one-half of the diameter of the part of the access hole 1a which is on the outer part of shielding 4. The length of access hole section 1 I prefer to make slightly less than access hole section 1a for reasons which will become obvious to those skilled in the art from the description of the operation given below.

Located inside access hole section 1a is coffin 5 which may be of lead, lead-lined steel or other suitable material. The inner plug 6 which may be a single plug the entire length of access hole section 1 or of more than one section as shown, is located so as to substantially fill the inner access hole section 1. This inner plug may be of any suitable shielding material and may even be hollow to accommodate materials to be tested, instruments, and so forth.

The opening 7 in coffin 5 is made slightly larger than the diameter of access hole section 1 and may also be tapered in accordance with shielding requirements, or have doors.

At the end of coffin 5 which is located nearest the reactor core 3, are located a set of coffin doors 8, operated by rods 9, as hereinbelow more fully described. The coffin doors 8 may be made of lead or other suitable material.

A shield door, also made of suitable shielding material, is provided at 12, coffin handling hooks at 10 and external handling system at 11, the functions of all of which are hereinbelow set forth more fully.

The shield door 12 may be located in access hole section 1a and when so located its operation will be modified accordingly as will be evident from a description of the operation which is set forth below.

Referring now to FIGURES 2 and 2–A, there is shown the principle of operation of one possible embodiment of coffin doors 28 which are located in a recess 33 in coffin 25 and are likewise made of any suitable shielding material. The doors as shown are arranged so that their surfaces would overlap to precent gamma streaming, and are positioned so as to turn with shafts 29 which are mounted in bearings 30. Rotation of shafts 29 may be effected by worm and wheel mechanisms 31 or other suitable means. The open position of the doors is shown at 32 and the recess provided for their operation at 33. The loss of shielding effect caused by this recess may be compensated for by increasing the length or thickness of the coffin or by other means if necessary. Many other possible coffin door configurations may be employed without altering the basic principle of my invention. Provision may be made for electrical leads and coolant lines.

The operation of my invention in the embodiment shown is as follows:

During normal operation of the reactor the position of the components of my invention are essentially as shown in FIGURE 1. When it is desired to gain access to the vicinity of the reactor core through one of the access holes, the reactor is first shut down. The shield door 12 is opened by a suitable mechanism (not shown), as are also the coffin doors as hereinbefore described. The inner plug or plugs 6 are then withdrawn from the beam hole section 1 into coffin 5 by any suitable mechanism (not shown). The close clearance, changes in diameter of the beam hole and the length of the plug themselves will serve to prevent any streaming of gamma radiation during this operation. A plug in its withdrawn position inside coffin 5 is shown at 12a. An additional door or central non-active plug may be used in outer end of opening 7.

Shield door 12 is then closed as are coffin doors 8. The coffin 5 containing plug 6 may then be removed by means of hooks 10 and handling system 11 with the aid of a truck, crane or other suitable means (also not shown), and discharged to a swimming pool, canal, or other suitable storage area. To reinsert the plug and put the reactor back in operation, the procedure is reversed.

The unusual results and advantages obtained should now be apparent. The innermost surfaces of the inner plugs 6 are bound to become radioactive because of their being subject to neutron bombardment from the core 3, while the reactor is in operation. Depending on its size and composition, the outer surfaces of plug 6 are more remote from core 3 during operation and hence less likely to be subject to induced radioactivity. When plug 6 is withdrawn to position 12a, or even farther outward in opening 7, it serves as an effective closure to opening 7 in preventing the escape of harmful radioactivity. The differences in diameter of the access hole section 1 and 1a and opening 7 serve to prevent streaming of harmful gamma or other forms of radiation.

It will now be obvious to those skilled in the art that I have introduced a novel reactor shield plug by converting the conventional reactor shield plug after removal of central non-active plug if such is used into two or more parts and have introduced a novel and unique method of operation in causing the least radioactive part of the plug to operate as a coffin for the more radioactive parts, thereby eliminating the use of outside or auxiliary coffins.

While I have shown a preferred embodiment of my invention herein, other embodiments will be apparent to those skilled in the art and I do not desire to limit the scope of the present invention by the foregoing description, except as limited by the following claims.

I claim:

1. The method of operating a nuclear reactor having a core, a solid shielding structure, an access opening in said shielding structure comprising an inner section and an outer section along its length, said inner section being positioned closer to the core of said reactor than said outer section, the said outer section having a cross-sectional area substantially greater than that of the said inner section, a radiation shield plug comprising a first radiation shield member and a second radiation shield member, an opening in said second member large enough to accomodate said first member, a first door positioned across the end of said opening in said second member nearest said first member, means for opening and closing said first door, means for positioning said first member in said opening in said second member, means for removing said second member from said access opening, a second door positioned across said access opening, and means for opening and closing said second door, which method comprises bringing said core to the critical condition so that a self-sustaining fission chain reaction occurs therein while said first member is positioned in said inner section and said second member is positioned in said outer section so that said second door is relatively free from the nuclear radiation emanating from said core and forms an integral part of said shielding structure.

2. The method of operating a nuclear reactor having a core, a solid shielding structure, an access opening in said shielding structure comprising an inner section and an outer section along its length, said inner section being positioned closer to the core of said reactor than said outer section, the said inner section being somewhat less than one-half the length of said outer section, the said outer section having a cross-sectional area somewhat more than twice the cross-sectional area of the inner section, a first radiation shield member, a second radiation shield member, an axial hole through the center of said second member, said hole having a cross-sectional area slightly greater than the cross-sectional area of said first member, a first door positioned across the end of said axial hole nearest said first member, means for opening and closing said first door, means for positioning said first member in said axial hole in said second member, means for removing said second member from said access opening, a second door positioned across said access opening, and means for opening and closing said second door, which method comprises bringing said core to the critical condition so that a self-sustaining fission chain reaction occurs therein while said first member is positioned in said inner section and said second shield member is positioned in said outer section so that said second door is relatively free from the nuclear radiation emanating from said core and forms an integral part of said shielding structure.

References Cited in the file of this patent

UNITED STATES PATENTS

| | | |
|---|---|---|
| 2,796,396 | Szilard | June 18, 1957 |
| 2,843,539 | Bornstein | July 15, 1958 |
| 2,856,339 | Wigner et al. | Oct. 14, 1958 |
| 2,863,815 | Moore et al. | Dec. 9, 1958 |
| 2,928,779 | Weills et al. | Mar. 15 1960 |
| 2,984,609 | Dickson et al. | May 16, 1961 |

OTHER REFERENCES

Nucleonics, vol. 13 (June 1955), pages 52–55.